(12) United States Patent
Guyon et al.

(10) Patent No.: US 11,528,475 B2
(45) Date of Patent: Dec. 13, 2022

(54) GRADIENT PREDICTOR FOR IMAGE COMPRESSION

(71) Applicant: Google LLC, Mountain View, CA (US)

(72) Inventors: Yannis Guyon, Paris (FR); Maryla Isuka Waclawa Ustarroz-Calonge, Paris (FR)

(73) Assignee: Google LLC, Mountain View, CA (US)

( * ) Notice: Subject to any disclaimer, the term of this patent is extended or adjusted under 35 U.S.C. 154(b) by 8 days.

(21) Appl. No.: 17/250,424

(22) PCT Filed: Jun. 30, 2020

(86) PCT No.: PCT/US2020/070217
§ 371 (c)(1),
(2) Date: Jan. 20, 2021

(87) PCT Pub. No.: WO2022/005521
PCT Pub. Date: Jan. 6, 2022

(65) Prior Publication Data
US 2021/0409682 A1    Dec. 30, 2021

(51) Int. Cl.
*H04N 19/70* (2014.01)
*H04N 19/105* (2014.01)
*H04N 19/176* (2014.01)
*H04N 19/186* (2014.01)
*H04N 19/59* (2014.01)

(52) U.S. Cl.
CPC ......... *H04N 19/105* (2014.11); *H04N 19/176* (2014.11); *H04N 19/186* (2014.11); *H04N 19/59* (2014.11)

(58) Field of Classification Search
CPC .. H04N 19/105; H04N 19/176; H04N 19/186; H04N 19/59; H04N 19/593; H04N 19/70
See application file for complete search history.

(56) References Cited

U.S. PATENT DOCUMENTS

2005/0201616 A1* 9/2005 Malvar ................. G06T 3/4015
382/167
2020/0036970 A1* 1/2020 Yoo ........................ H04N 19/11

FOREIGN PATENT DOCUMENTS

WO        2017192898 A1    11/2017

OTHER PUBLICATIONS

International Search Report and Written Opinion for International Application No. PCT/US2020/070217, dated Dec. 2, 2020, 11 pages.

(Continued)

*Primary Examiner* — Patrick E Demosky
(74) *Attorney, Agent, or Firm* — Brake Hughes Bellermann LLP

(57) ABSTRACT

A method includes selecting, from an image, a target block of pixels to be compressed, selecting a neighbor column of the target block, selecting a neighbor row of the target block, generating two or more basis values based on at least one of a portion of pixels of the neighbor column and a portion of pixels of the neighbor row, calculating a gradient based on the two or more basis values, and assigning at least one predictor for the target block using the calculated gradient.

20 Claims, 11 Drawing Sheets

(56) References Cited

OTHER PUBLICATIONS

Kanumuri, et al., "Enhancements to Intra Coding", Joint Collaborative Team on Video Coding (JCT-VC) of ITU-T SG16 WP3 and ISO/IEC JTC1/SC29/WG11, retrieved on Jan. 22, 2011 from http://phenix.int-evry.fr/jct/doc_end_user/documents/4_Daegu/wg/JCTVC-D235-v3.zip JCTVC-D235.doc, Jan. 20-28, 2011, XP030226729, 7 pages.
Lainema, et al., "Intra Coding of the HEVC Standard", IEEE Transactions on Circuits and Systems for Video Technology, vol. 22, No. 12, XP055559664, Dec. 2012, pp. 1792-1801.
"AV1", Wikipedia, retrieved on Jan. 18, 2021 from https://en.wikipedia.org/wiki/AV1#Intra_Prediction, 15 pages.
"Inside WebM Technology: VP8 Intra and Inter Prediction", The WebM Project, http://www.webmproject.org, Jul. 20, 2010, 5 pages.
Winkelmann, "Intra prediction in HEVC", 2012, 14 pages.

\* cited by examiner

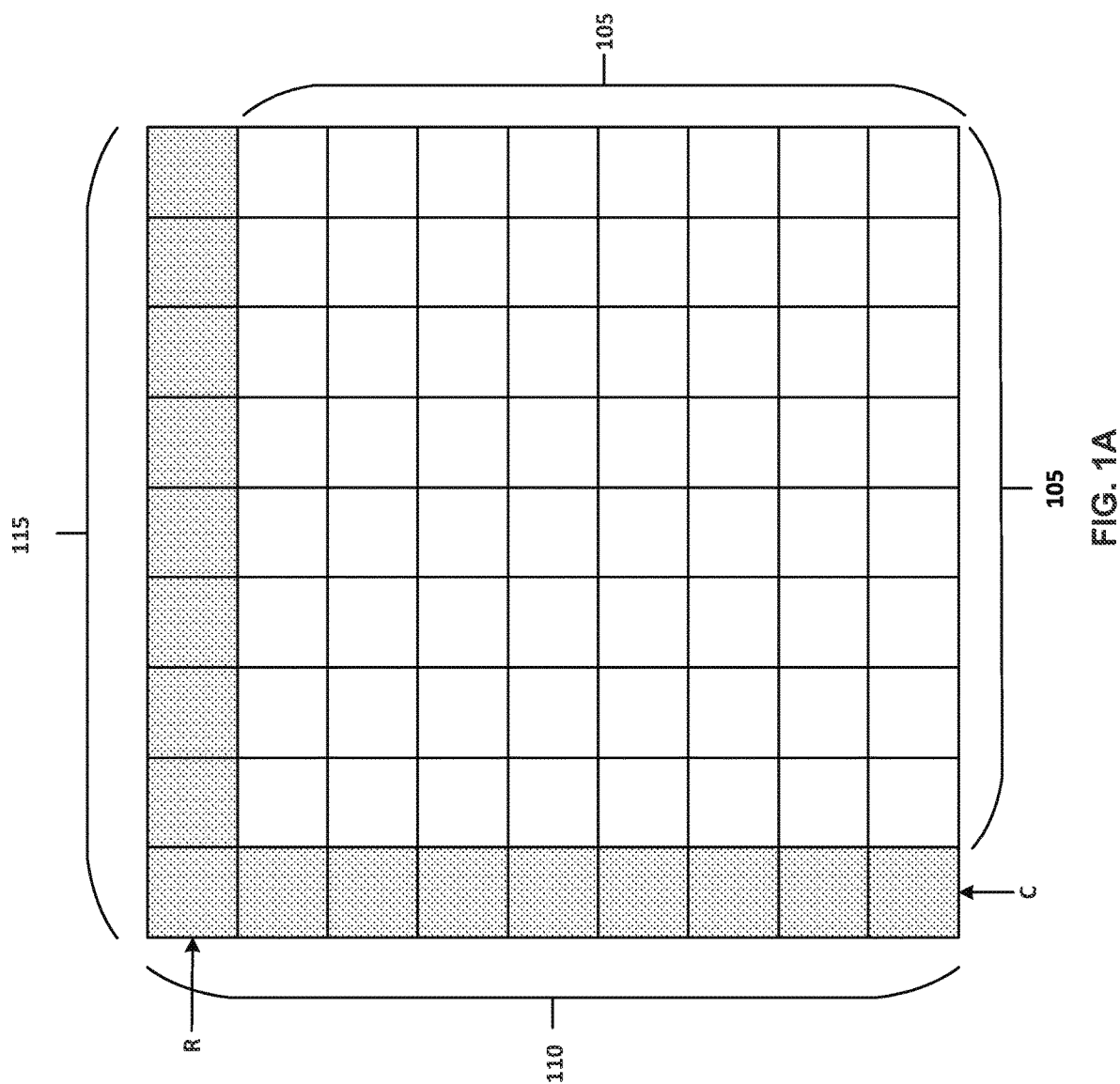

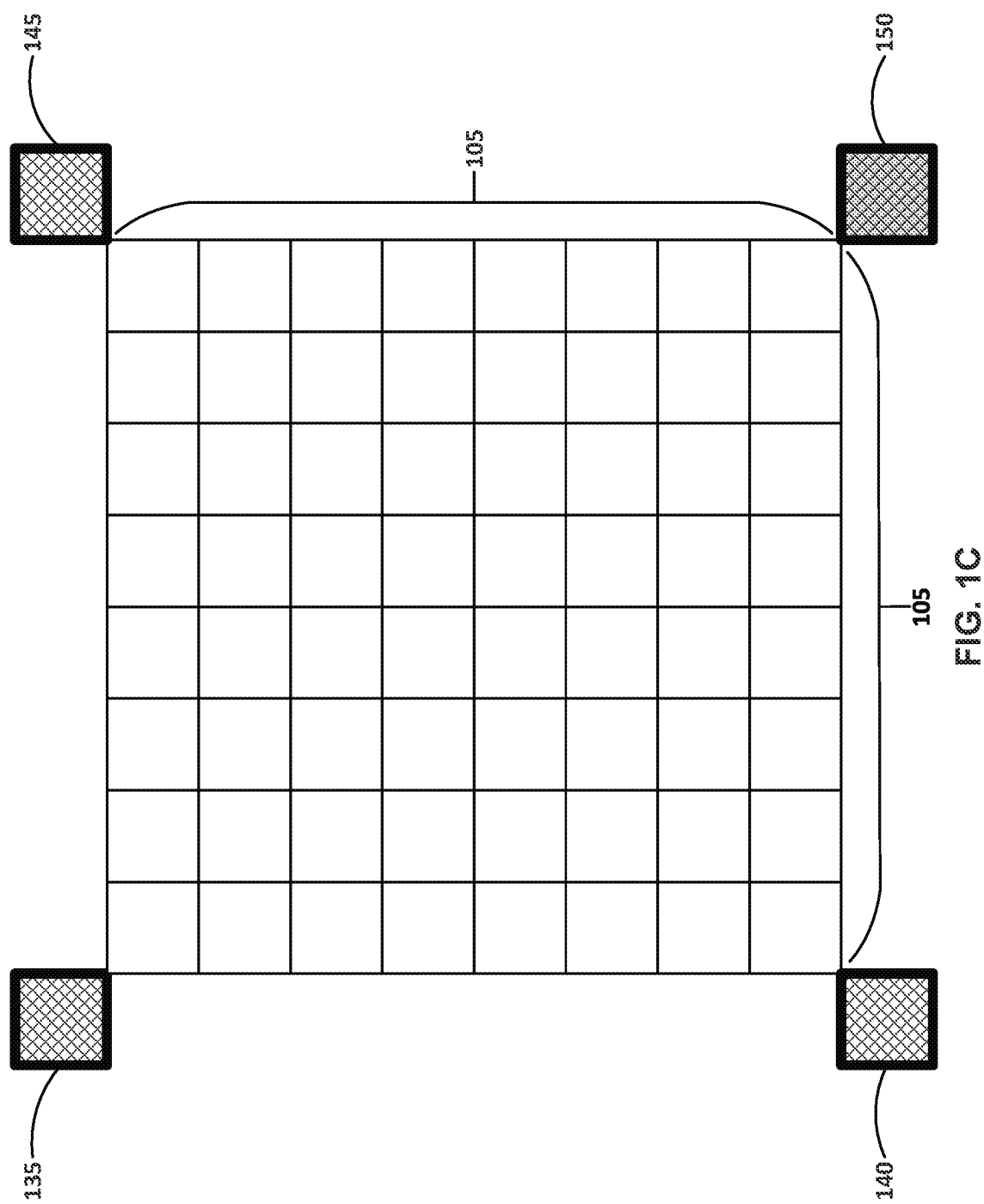

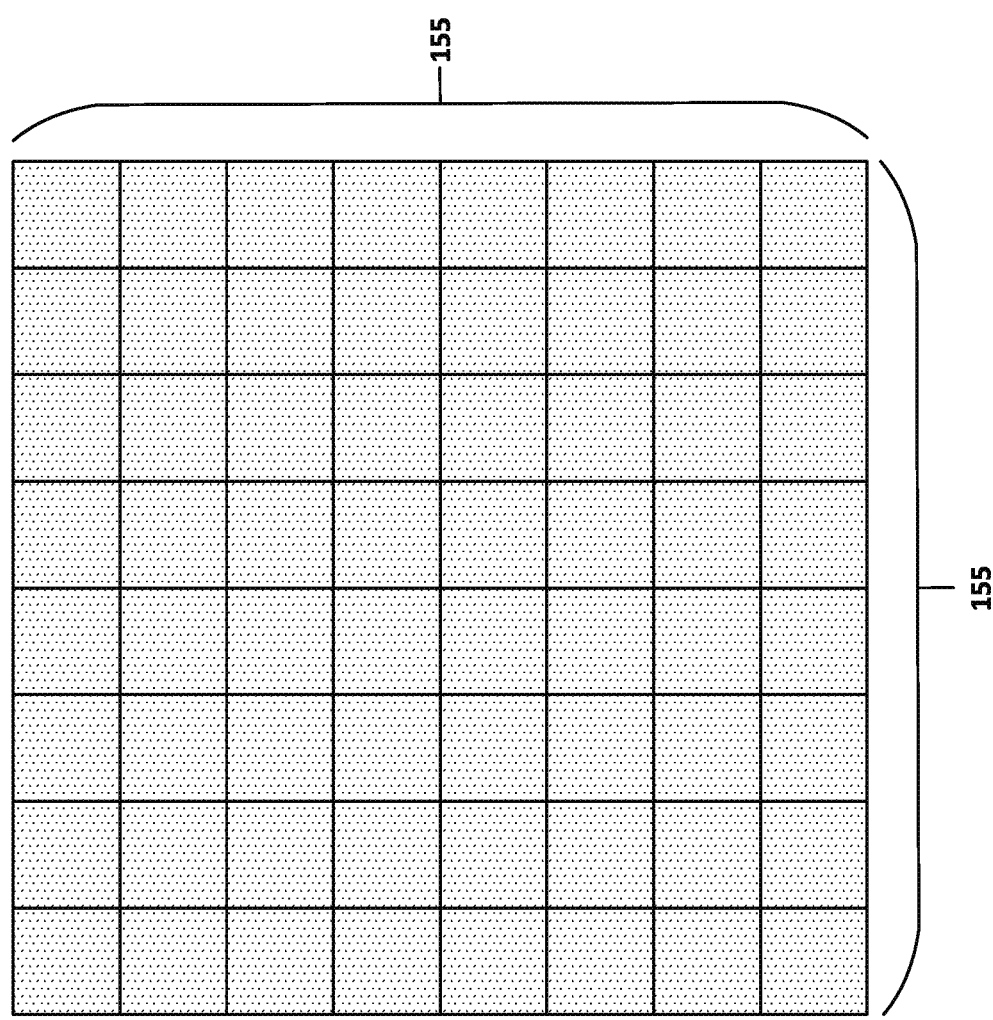

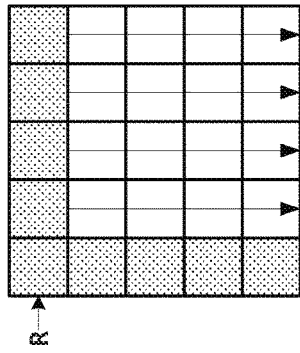
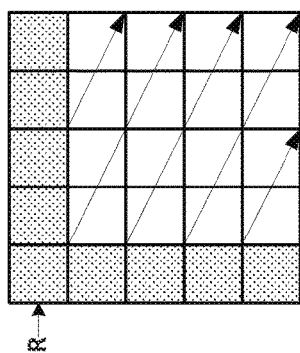
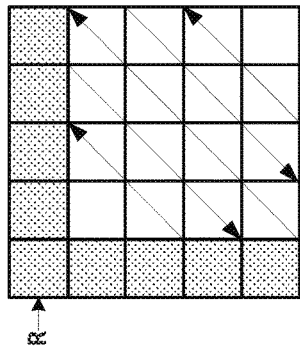
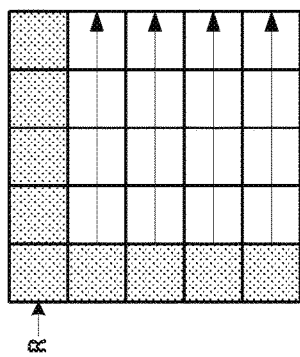
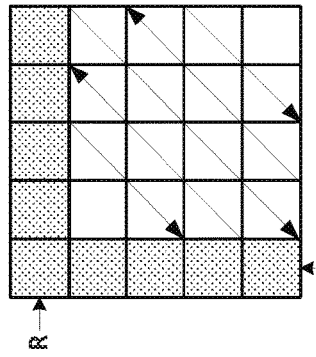
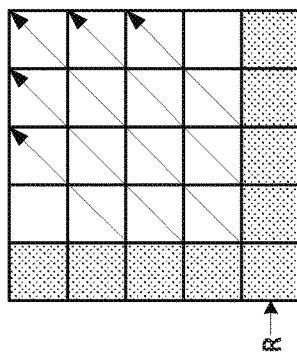
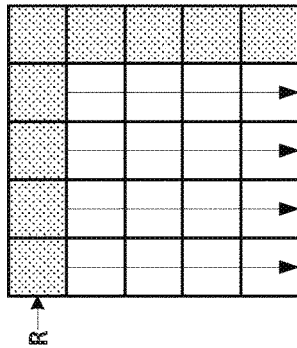
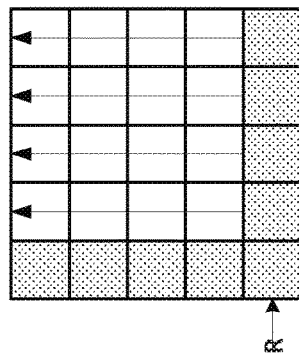
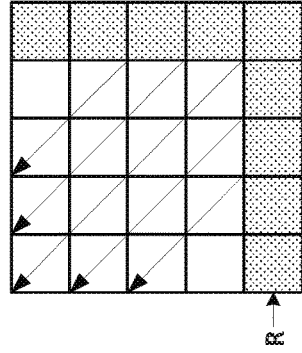
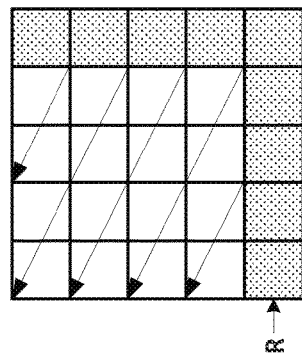
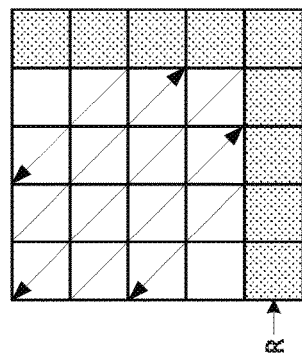

GRADIENT PREDICTOR FOR IMAGE COMPRESSION

CROSS-REFERENCE TO RELATED APPLICATION

This application is a 35 U.S.C. § 371 National Phase Entry Application from PCT/US2020/070217, filed on Jun. 30, 2030, entitled "GRADIENT PREDICTOR FOR IMAGE COMPRESSION", the disclosure of which is incorporated by reference herein in its entirety.

FIELD

Embodiments relate to compressing and decompressing images.

BACKGROUND

Image compression/decompression traditionally segments an image into blocks of pixels. During encoding (compressing), pixels of previously compressed blocks may be reused as context to predict the pixels of the current block. During decoding (decompressing), pixels of the previously decompressed blocks may be reused as context to predict the pixels of the current block. A predictor is an algorithm that takes these context samples (usually bordering the block to be compressed/decompressed on its left and top sides) as input and output starting values for calculating prediction values for use during compression and/or during decompression in the block, that may later be completed by more encoded information and/or filtered to obtain the final reconstructed samples.

SUMMARY

In a general aspect, a device, a system, a non-transitory computer-readable medium (having stored thereon computer executable program code which can be executed on a computer system), and/or a method can perform a process with a method including selecting, from an image, a target block of pixels to be compressed, selecting a neighbor column of the target block, selecting a neighbor row of the target block, generating two or more basis values based on at least one of a portion of pixels of the neighbor column and a portion of pixels of the neighbor row, calculating a gradient based on the two or more basis values, and assigning at least one predictor for the target block using the calculated gradient.

Implementations can include one or more of the following features. For example, the method can further comprise generating residuals based on the target block and the predictors. The selecting of the neighbor column can include selecting processed pixels, the selecting of the neighbor row can include selecting processed pixels, the neighbor column can be one of a left column or a right column, and the neighbor row can be one of an upper row or a lower row. The two or more basis values can be associated with basis pixels located at two or more corners of the target block. The two or more basis values can be associated with basis pixels located at two or more corners of the target block, and the generating of the two or more basis values can include calculating an average of two or more processed pixels.

For example, the two or more basis values can be four basis values associated with basis pixels located at each corner of the target block, three of the four basis values can be calculated based on an average of at least one of the portion of the pixels from the neighbor column and the portion of the pixels from the neighbor row, and a fourth basis value of the four basis values can be interpolated based on the three calculated basis values. The calculating of the gradient can include using a gradient algorithm to generate pixel values for each cell in a column x row matrix using a progressive transition between colors of the two or more basis values. The calculating of the gradient can include using a bilinear interpolation of a gradient algorithm. The assigning of the predictors for the target block can include mapping pixels associated with the gradient to pixels in the target block, and assigning color values associated with the gradient as prediction values for the target block based on the mapping of the pixels.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIGS. 1A, 1B, 1C and 1D illustrate a progression for calculating prediction values in a prediction of an N×N block of pixels according to an example implementation.

FIGS. 2A through 2K illustrate some patterns for processing pixels, blocks and/or macro-blocks of pixels.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

A predictor algorithm that uses bordering blocks (e.g., to the left and/or above) as context samples for calculating prediction values during compression and/or decompression can cause block edge artifacts when generating pixels during decompression. Block edge artifacts can cause visible edges between blocks after reconstructing an image. Reducing or eliminating these block edge artifacts may necessitate the use of a post-reconstruction (e.g., a filter) process during decompression. Example implementations can include use of a prediction algorithm including a gradient predictor. The use of the gradient predictor can reduce or eliminate block edge artifacts without the need of a post-reconstruction (e.g., a filter) process (to reduce or eliminate block edge artifacts).

Figure 1B:
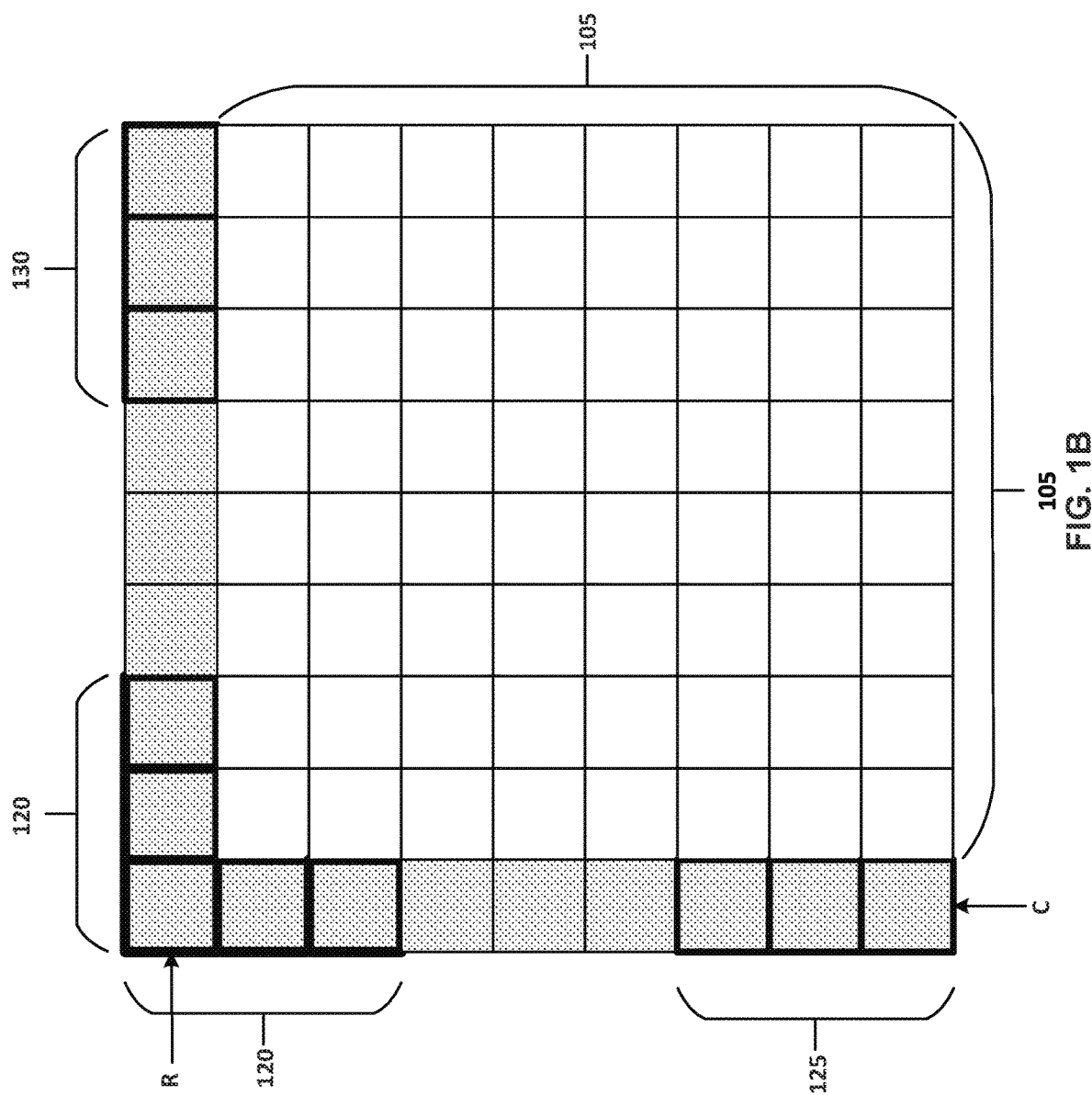

FIGS. 1A, 1B and 1C illustrate a progression for calculating prediction values in a prediction of an N×N block of pixels according to an example implementation. FIG. 1D illustrates the resultant N×N block having a prediction value for each block.

Compressing (or decompressing) a block or macroblock can include using an intra-frame prediction process. Intra-frame prediction can take advantage of spatial redundancy of pixels (e.g., spatially close pixels) in delta coding. The gradient predictor can be used to determine (or calculate) block prediction values (e.g., predicted pixel values, extrapolated pixel values, representative pixel values, and/or the like) for use in the delta coding. In other words, prediction values (or prediction) can be a predicted value (e.g., pixel value) for use in calculating a residual in an image compression scheme that uses delta coding. For example, residual=actual (pixel value)−predicted (pixel value). Further, prediction can be a predicted value for use in calculating a reconstructed pixel in an image decompression scheme that uses delta coding. For example, reconstructed pixel=residual+predicted.

As shown in FIGS. 1A-1D, the N×N block is an 8×8 block shown as a target block 105 of pixels (shown in white (not shaded)). However, other block sizes (e.g., 4×4, 16×16, and the like) or Columns x Rows (4×4, 4×6, 4×8, 8×12, 10×12, 8×16, and/or the like) are within the scope of this disclosure. As shown in FIG. 1A, processed pixels 110 (in column C shaded in grey) can be previously compressed or decompressed pixels to the left of target block 105. Further, processed pixels 115 (in row R shaded in grey) can be previously compressed or decompressed pixels above target block 105. One pixel (illustrated in the upper left-hand corner) is shared between processed pixels 110 and processed pixels 115. There are no previously compressed or decompressed pixels illustrated to the right or below target block 105 because (if these pixels exist) the pixels are yet to be compressed or decompressed pixels.

As shown in FIG. 1B, processed pixels 120 (a portion of processed pixels 110 in column C and a portion of processed pixels 115 in row R), processed pixels 125 (which includes a portion of processed pixels 110 column C), and processed pixels 130 (which includes a portion of processed pixels 115 in row R) can be a portion of the processed pixels 110, 115. Processed pixels 120, processed pixels 125, and processed pixels 130 are illustrated as having bolded borders within processed pixels 110 and/or processed pixels 115. Processed pixels 120, processed pixels 125, and processed pixels 130 can be selected as pixels to be used in calculating pixel values to form the basis for a gradient algorithm. As shown in FIG. 1B three (3) pixels can be selected at each corner (resulting in five (5) pixels total in the upper left corner) of the N×N block. However, the selection of other numbers of pixels (e.g., one (1), two (2), four (4), five (5), and the like) are within the scope of this disclosure.

Now referring to FIGS. 1B and 1C, basis pixel 135, basis pixel 140, basis pixel 145 and basis pixel 150 can be pixels used to form the basis for a gradient algorithm. The gradient algorithm can be used to determine (e.g., calculate) prediction (e.g., pixel values) for target block 105. The basis value for basis pixel 135 (shown in FIG. 1C) can be determined based on processed pixels 120 (shown in FIG. 1B). Generating basis values (e.g., two or more basis values) can include calculating an average of two or more processed pixels. For example, an average of the pixel values of processed pixels 120 can be calculated and the resultant value can be assigned to basis pixel 135. The basis value for basis pixel 140 (shown in FIG. 1C) can be determined based on processed pixels 125 (shown in FIG. 1B). For example, an average of the pixel values of processed pixels 125 can be calculated and the resultant value can be assigned to basis pixel 140. The basis value for basis pixel 145 (shown in FIG. 1C) can be determined based on processed pixels 130 (shown in FIG. 1B). For example, an average of the pixel values of processed pixels 130 can be calculated and the resultant value can be assigned to basis pixel 145. Basis pixel 135 (shown in FIG. 1C) can be located at the intersection (e.g., corner) of processed pixels 110 and processed pixels 115 (shown in FIG. 1A). Basis pixel 140 can be located within processed pixels 110 at the opposite end of column C as basis pixel 135. Basis pixel 145 can be located within processed pixels 115 at the opposite end of row R as basis pixel 135. In other words, the basis pixels 135, 140, 145 can be located at the corners of target block 105, but not included in target block 105 (shown in FIG. 1A).

Basis pixel 150 (shown in FIG. 1C) is located at the corner of (but not included in) target block 105 that is opposite (at a diagonal) basis pixel 135. The location of basis pixel 150 is not within previously compressed or decompressed pixels. Therefore, basis pixel 150 can use some other algorithm to assign a basis value. The basis value for basis pixel 150 can be determined based on basis pixel 135, basis pixel 140 and basis pixel 145. For example, an extrapolation of the basis values of basis pixel 135, basis pixel 140 and basis pixel 145 can be calculated and the resultant value can be assigned to basis pixel 150. The extrapolation can be basis pixel 140+basis pixel 145−basis pixel 135. For example, an average of the basis values of basis pixel 135, basis pixel 140 and basis pixel 145 can be calculated and the resultant value can be assigned to basis pixel 150.

Now referring to FIG. 1D, prediction block 155 of pixels (corresponding to target block 105) is illustrated as having a prediction (e.g., representing a pixel value). In other words, as described above, the pixels of prediction block 155 have an assigned value (e.g., representing a pixel value) for use in an image compression/decompression scheme that uses delta coding. The prediction can be calculated based on a gradient algorithm. The gradient algorithm can use a basis value selected from at least one of basis pixel 135, basis pixel 140, basis pixel 145 and basis pixel 150. The gradient algorithm can be a bilinear interpolation. For example, a gradient algorithm can have a start value (e.g., color) and a stop value (e.g., color). A gradient algorithm can have a direction. For example, the gradient algorithm can go from left to right, right to left, top to bottom, bottom to top, corner to corner and/or the like. A gradient algorithm can be a combination of colors and direction. For example, a gradient algorithm can go from left to right in a first pass and top to bottom in a second pass. The prediction block 155 can be assigned a prediction (e.g., pixel values) using the gradient algorithm.

In some implementations, one of a plurality of patterns for processing pixels, blocks and/or macro-blocks of pixels can be selected (e.g., as an encoder option). Processed pixels, blocks and/or macro-blocks of pixels include pixels that can be selected for use in a prediction process. In other words, as processing (e.g., encoding or compressing) of pixels, blocks and/or macro-blocks of pixels progresses, based on the selected pattern, pixels that have been processed (e.g., encoded or compressed) (shown as shaded in grey) become available for use in a future prediction process. Further, unprocessed pixels, blocks and/or macro-blocks of pixels (shown in white (not shaded)) do not include pixels (e.g., because the pixels have not yet been encoded or compressed) that can be selected for use in a prediction process.

The pattern can determine a beginning position (e.g., a location of a pixel or block) as well as the order and/or direction for processing pixels, blocks and/or macro-blocks of pixels. For example, the pattern can begin in a corner (e.g., upper-left, upper-right, lower-left, or lower-right) and can have processing traversal flow directions that include horizontal, vertical, diagonal, and/or the like. The processing traversal flow directions can include left (e.g., horizontal left), right (e.g., horizontal right), up (e.g., horizontal up), down (e.g., horizontal down), combinations (e.g., diagonal down-left), and/or the like.

The pattern for processing pixels, blocks and/or macro-blocks of pixels determines the order in which pixels are processed (e.g., encoded or compressed) resulting in which column (e.g., column C in FIGS. 1A and 1B) and row (e.g., row R in FIGS. 1A and 1B) include the processed pixels (shown as shaded in grey). As mentioned above, as the processing of a pixel is completed, the pixel can be selected for use in a future prediction process, whereas unprocessed pixels (shown in white (not shaded)) may not be selected for use in a prediction process. FIGS. 1A and 1B can illustrate the result of the selection of a pattern that results in a left column (column C) and an upper row (row R) that include pixels that have been processed (e.g., encoded or compressed) based on the pattern and can be selected for use in the prediction process.

FIGS. 2A-2K illustrate some patterns for processing pixels, blocks and/or macro-blocks of pixels. FIGS. 2A-2K illustrate eleven (11) patterns for processing pixels, blocks and/or macro-blocks of pixels. However, other patterns are within the scope of this disclosure. In FIGS. 2A-2K, processed pixels, blocks or macro-blocks are in column C (shaded in grey) and row R (shaded in grey) and target pixels, blocks or macro-blocks are shown in white (not shaded) as a 4×4 blocks.

FIG. 2A illustrates a vertical processing flow that begins in the upper-left corner and has a processing direction that moves from top to bottom and from left to right. FIG. 2B illustrates a horizontal-right processing flow direction that moves from top to bottom and from left to right. FIG. 2C illustrates a horizontal-down processing flow that begins in the upper-left corner and has a processing direction that moves from left to right. FIG. 2D illustrates a diagonal up-right and down-left (zig-zag) processing flow direction that moves from left to right. FIG. 2E illustrates another diagonal up-right and down-left (zig-zag) processing flow that begins in the upper-left corner and has a processing direction that moves from left to right. In FIGS. 2A-2E, the process flow results in pixels that have been processed (e.g., encoded or compressed) that become available for use in a future prediction process being in the left column C (shaded in grey) and the upper row R (shaded in grey). Therefore, processed blocks (which include pixels that can be used in a prediction process) are the upper and left neighbors, whereas unprocessed pixels (shown in white (not shaded)) may not be selected for use in a prediction process. Therefore, prediction can include the use of upper and left neighbors as context. As such, calculating prediction values in a prediction of the target blocks is as described above regarding FIGS. 1A-1D.

FIG. 2F illustrates a vertical processing flow that begins in the lower-left corner and has a processing direction that moves from bottom to top and from left to right. FIG. 2G illustrates a diagonal up-right processing flow that begins in the lower-left corner and has a processing direction that moves from left to right. In FIGS. 2F and 2G, the process flow results in pixels that have been processed (e.g., encoded or compressed) that become available for use in a future prediction process being in the left column C (shaded in grey) and the lower row R (shaded in grey). Therefore, processed blocks (which include pixels that can be used in a prediction process) are the bottom and left neighbors, whereas unprocessed pixels (shown in white (not shaded)) may not be selected for use in a prediction process. Therefore, prediction can include the use of bottom and left neighbors as context. In this example implementation, calculating prediction values in a prediction of the target blocks can use a gradient predictor calculation technique similar to that described above in FIGS. 1A-1D. However, the basis values can be determined based on processed pixels in the bottom and left neighbors as opposed to the upper and left neighbors as in FIGS. 1A-1D.

FIG. 2H illustrates a vertical processing flow that begins in the upper-right corner and has a processing direction that moves from top to bottom and from right to left. In FIG. 2H, the process flow results in pixels that have been processed (e.g., encoded or compressed) that become available for use in a future prediction process being in the right column C (shaded in grey) and the upper row R (shaded in grey). Therefore, processed blocks (which include pixels that can be used in a prediction process) are the top and right neighbors, whereas unprocessed pixels (shown in white (not shaded)) may not be selected for use in a prediction process. Therefore, prediction can include the use of top and right neighbors as context. In this example implementation, calculating prediction values in a prediction of the target blocks can use a gradient predictor calculation technique similar to that described above in FIGS. 1A-1D. However, the basis values can be determined based on processed pixels in the top and right neighbors as opposed to the upper and left neighbors as in FIGS. 1A-1D.

FIG. 2I illustrates a diagonal up-left processing flow direction that begins in the lower-right corner and has a processing. FIG. 2J illustrates a horizontal-up processing flow that begins in the lower-right corner and has a processing direction that moves from right to left. FIG. 2K illustrates a diagonal up-left and down-right (zig-zag) processing flow that begins in the lower-right corner and has a processing direction that moves from right to left. In FIGS. 2I-2K, the process flow results in pixels that have been processed (e.g., encoded or compressed) that become available for use in a future prediction process being in the right column C (shaded in grey) and the lower row R (shaded in grey), whereas unprocessed pixels (shown in white (not shaded)) may not be selected for use in a prediction process. Therefore, processed blocks are the bottom and right neighbors. Therefore, prediction can include the use of bottom and right neighbors as context. In this example implementation, calculating prediction values in a prediction of the target blocks can use a gradient predictor calculation technique similar to that described above in FIGS. 1A-1D. However, the basis values can be determined based on processed pixels in the bottom and right neighbors as opposed to the upper and left neighbors as in FIGS. 1A-1D.

The example shown in FIGS. 2A-2K illustrate example processing flows that result in one (1) row and one (1) column having processed blocks and/or processed pixels. However, other processing flows can be within the scope of this disclosure. For example, processing traversal flow directions that include combinations of horizontal, vertical, diagonal, and/or the like are possible. These processing flows can result in having processed blocks and/or processed pixels in two (2) columns and/or two (2) rows. For example, left column and/or right column with top row and/or bottom row of processed blocks and/or processed pixels combinations can be possible. In an example implementation, a processing flow can result in a left-top-right processed blocks and/or processed pixels combination.

Figure 3B:
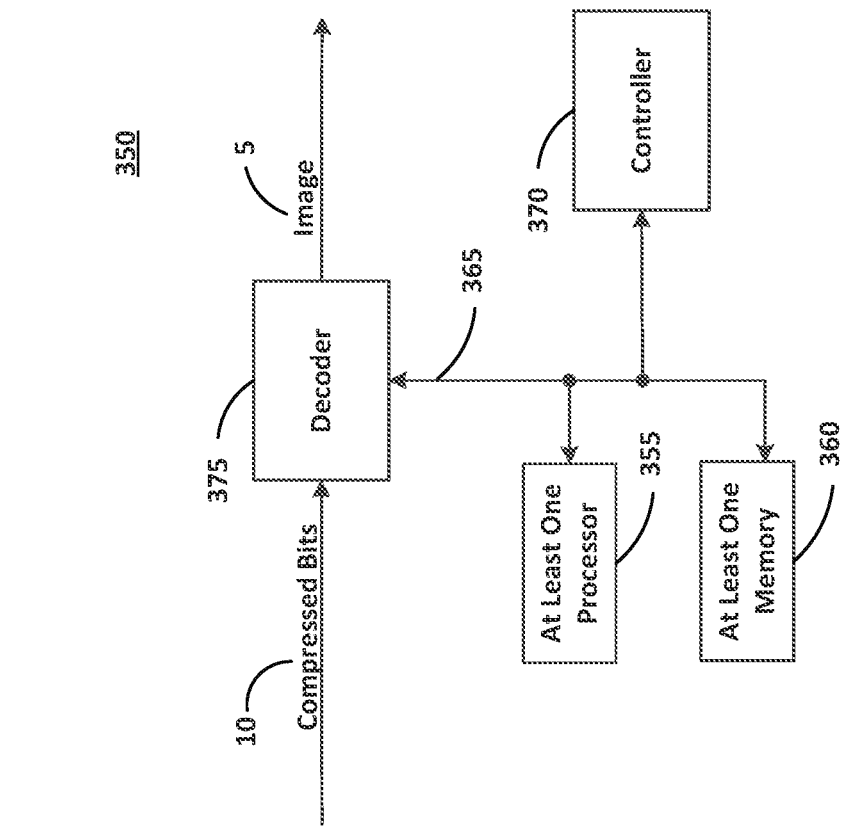
FIG. 3B illustrates a decoder system according to at least one example embodiment.
Figure 3A:
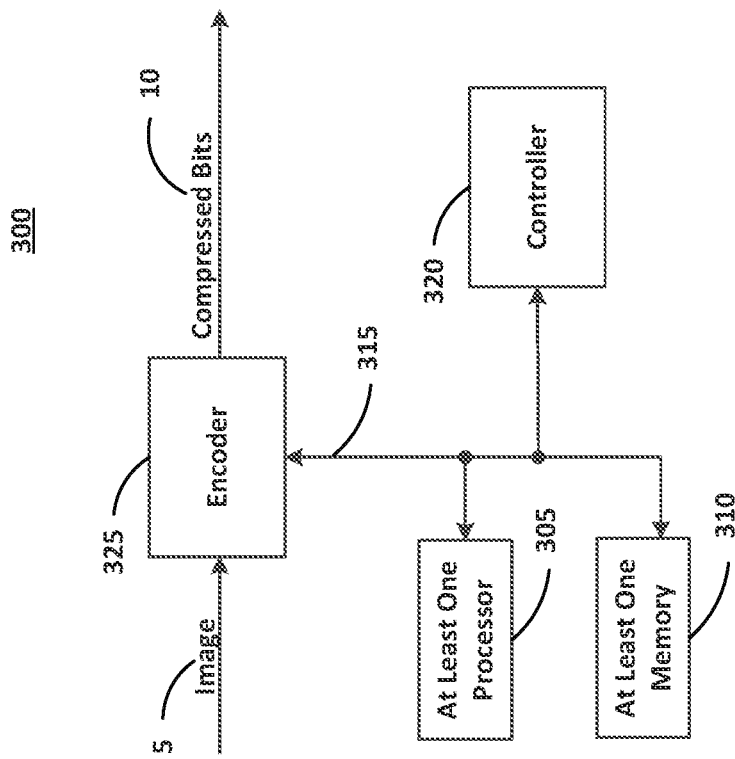
FIG. 3A illustrates an encoder system according to at least one example embodiment.

In the example of FIG. 3A, an encoder system 300 may be, or include, at least one computing device and should be understood to represent virtually any computing device configured to perform the techniques described herein. As such, the encoder system 300 may be understood to include various components which may be utilized to implement the techniques described herein, or different or future versions thereof. By way of example, the encoder system 300 is illustrated as including at least one processor 305, as well as at least one memory 310 (e.g., a non-transitory computer readable storage medium).

FIG. 3A illustrates the encoder system according to at least one example embodiment. As shown in FIG. 3A, the encoder system 300 includes the at least one processor 305, the at least one memory 310, a controller 320, and an encoder 325. The at least one processor 305, the at least one memory 310, the controller 320, and the encoder 325 are communicatively coupled via bus 315.

The at least one processor 305 may be utilized to execute instructions stored on the at least one memory 310. Therefore, the at least one processor 305 can implement the various features and functions described herein, or additional or alternative features and functions. The at least one processor 305 and the at least one memory 310 may be utilized for various other purposes. For example, the at least one memory 310 may represent an example of various types of memory and related hardware and software which may be used to implement any one of the modules described herein.

The at least one memory 310 may be configured to store data and/or information associated with the encoder system 300. The at least one memory 310 may be a shared resource. For example, the encoder system 300 may be an element of a larger system (e.g., a server, a personal computer, a mobile device, and/or the like). Therefore, the at least one memory 310 may be configured to store data and/or information associated with other elements (e.g., image/video serving, web browsing or wired/wireless communication) within the larger system.

The controller 320 may be configured to generate various control signals and communicate the control signals to various blocks in the encoder system 300. The controller 320 may be configured to generate the control signals to implement the techniques described herein. The controller 320 may be configured to control the encoder 325 to encode an image, a sequence of images, a video frame, a sequence of video frames, and/or the like according to example implementations. For example, the controller 320 may generate control signals corresponding to intra-coding modes.

The encoder 325 may be configured to receive an input image 5 (and/or a video stream) and output compressed (e.g., encoded) bits 10. The encoder 325 may convert a video input into discrete video frames (e.g., as images). The input image 5 may be compressed (e.g., encoded) as compressed image bits. The encoder 325 may further convert each image (or discrete video frame) into a matrix of blocks or macroblocks (hereinafter referred to as blocks). For example, an image may be converted to a 32×32, a 32×16, a 16×16, a 16×8, an 8×8, a 4×8, a 4×4 or a 2×2 matrix of blocks each having a number of pixels. Although eight (8) example matrices are listed, example implementations are not limited thereto.

The compressed bits 10 may represent the output of the encoder system 300. For example, the compressed bits 10 may represent an encoded image (or video frame). For example, the compressed bits 10 may be stored in a memory (e.g., at least one memory 310). For example, the compressed bits 10 may be ready for transmission to a receiving device (not shown). For example, the compressed bits 10 may be transmitted to a system transceiver (not shown) for transmission to the receiving device.

The at least one processor 305 may be configured to execute computer instructions associated with the controller 320 and/or the encoder 325. The at least one processor 305 may be a shared resource. For example, the encoder system 300 may be an element of a larger system (e.g., a mobile device, a server, and/or the like). Therefore, the at least one processor 305 may be configured to execute computer instructions associated with other elements (e.g., image/video serving, web browsing or wired/wireless communication) within the larger system.

FIG. 3B illustrates the decoder system according to at least one example embodiment. As shown in FIG. 3B, the decoder system 350 includes the at least one processor 355, the at least one memory 360, a controller 370, and a decoder 375. The at least one processor 355, the at least one memory 360, the controller 370, and the decoder 375 are communicatively coupled via bus 365.

In the example of FIG. 3B, a decoder system 350 may be at least one computing device and should be understood to represent virtually any computing device configured to perform the techniques described herein. As such, the decoder system 350 may be understood to include various components which may be utilized to implement the techniques described herein, or different or future versions thereof. For example, the decoder system 350 is illustrated as including at least one processor 355, as well as at least one memory 360 (e.g., a computer readable storage medium).

Therefore, the at least one processor 355 may be utilized to execute instructions stored on the at least one memory 360. As such, the at least one processor 355 can implement the various features and functions described herein, or additional or alternative features and functions. The at least one processor 355 and the at least one memory 360 may be utilized for various other purposes. For example, the at least one memory 360 may be understood to represent an example of various types of memory and related hardware and software which can be used to implement any one of the modules described herein. According to example implementations, the encoder system 300 and the decoder system 350 may be included in a same larger system (e.g., a personal computer, a mobile device and the like).

The at least one memory 360 may be configured to store data and/or information associated with the decoder system 350. The at least one memory 360 may be a shared resource. For example, the decoder system 350 may be an element of a larger system (e.g., a personal computer, a mobile device, and the like). Therefore, the at least one memory 360 may be configured to store data and/or information associated with other elements (e.g., web browsing or wireless communication) within the larger system.

The controller 370 may be configured to generate various control signals and communicate the control signals to various blocks in the decoder system 350. The controller 370 may be configured to generate the control signals in order to implement the video encoding/decoding techniques described herein. The controller 370 may be configured to control the decoder 375 to decode a video frame according to example implementations.

The decoder 375 may be configured to receive compressed (e.g., encoded) bits 10 as input and output an image 5. The compressed (e.g., encoded) bits 10 may also represent compressed video bits (e.g., a video frame). Therefore, the decoder 375 may convert discrete video frames of the compressed bits 10 into a video stream.

The at least one processor 355 may be configured to execute computer instructions associated with the controller 370 and/or the decoder 375. The at least one processor 355 may be a shared resource. For example, the decoder system 350 may be an element of a larger system (e.g., a personal computer, a mobile device, and the like). Therefore, the at least one processor 355 may be configured to execute computer instructions associated with other elements (e.g., web browsing or wireless communication) within the larger system.

Figure 4A:
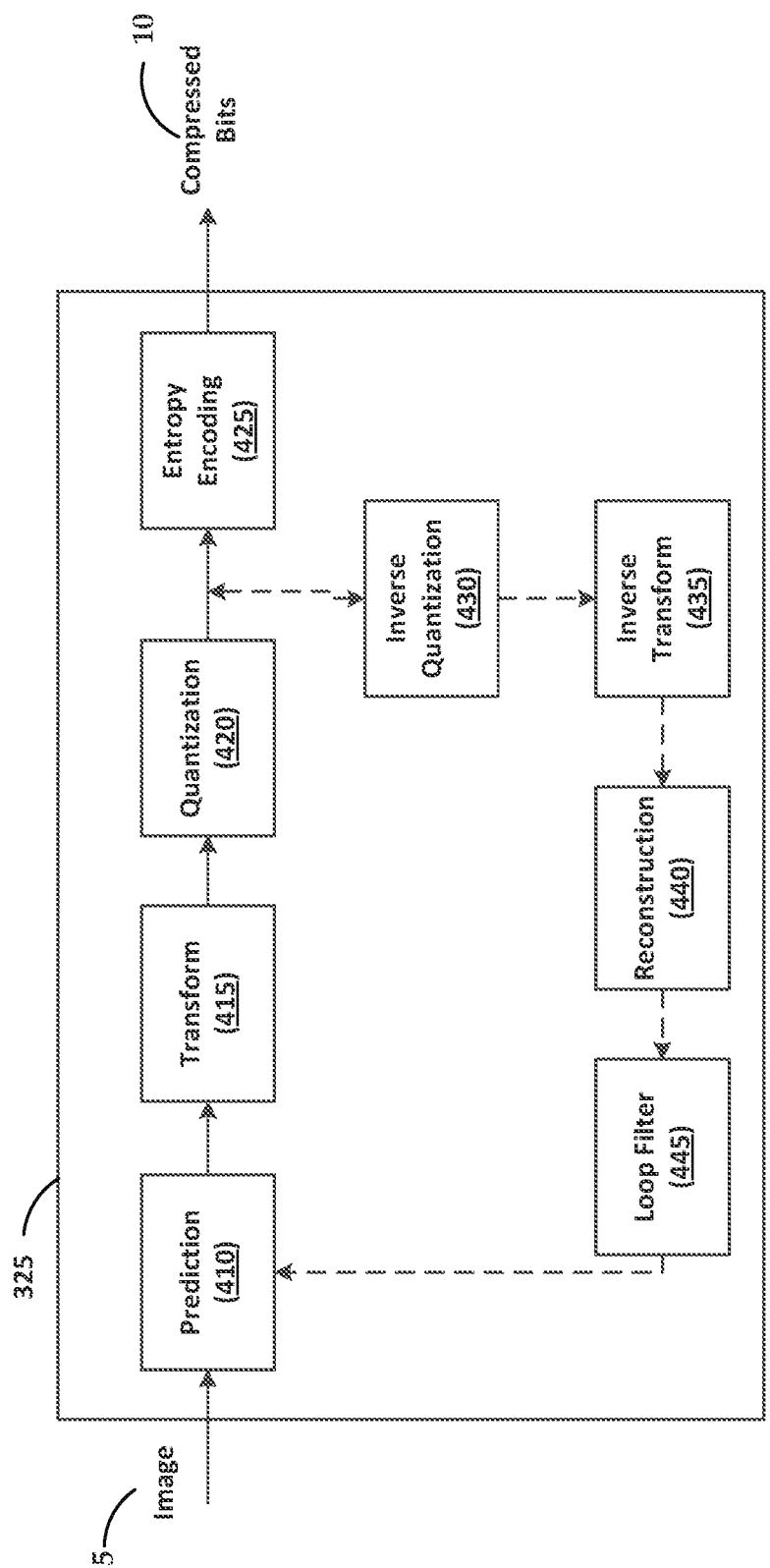
FIG. 4A illustrates a flow diagram for an encoder system according to at least one example embodiment.
Figure 4B:
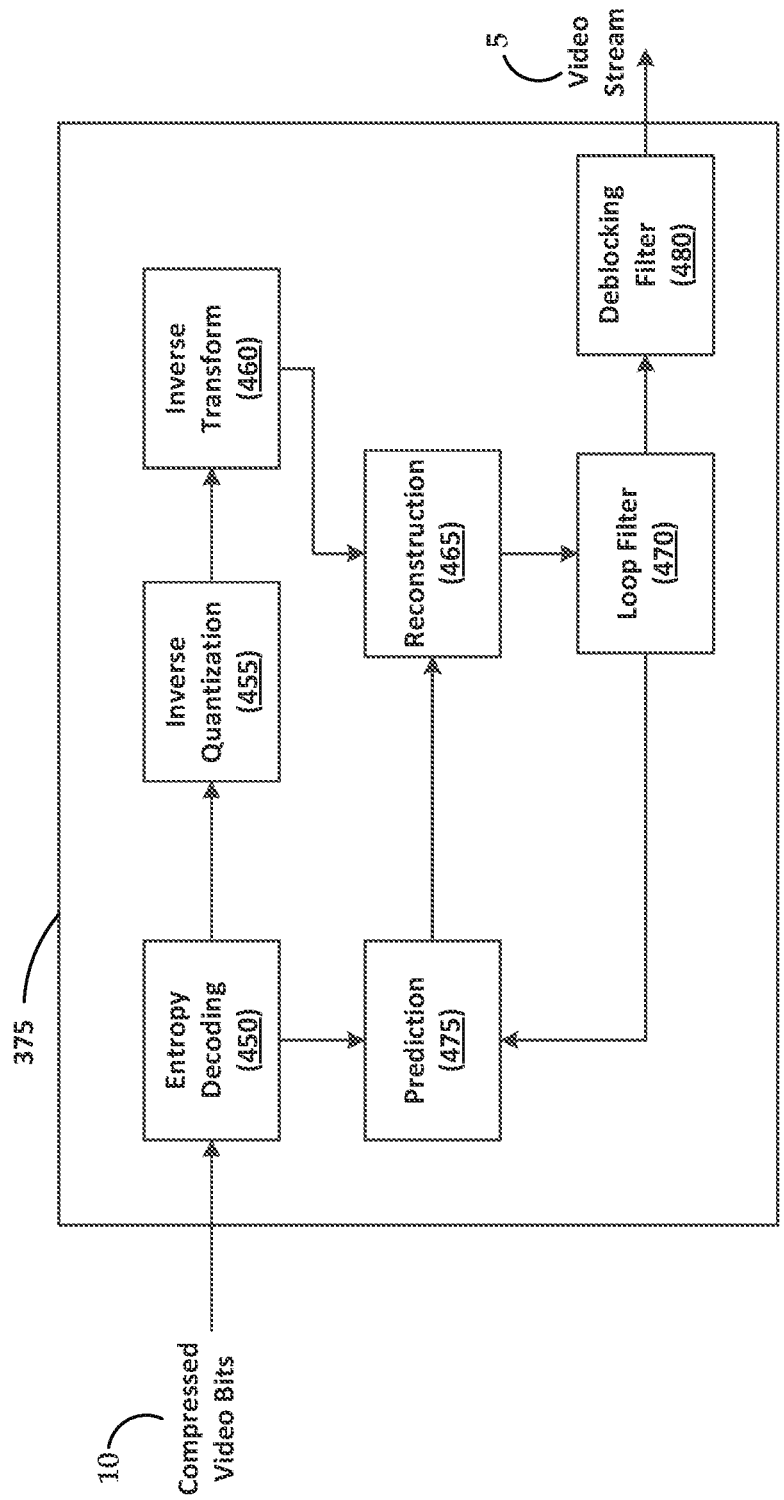
FIG. 4B illustrates a flow diagram for a decoder system according to at least one example embodiment.

FIGS. 4A and 4B illustrate a flow diagram for the encoder 325 shown in FIG. 3A and the decoder 375 shown in FIG. 3B, respectively, according to at least one example implementation. The encoder 325 (described above) includes a prediction block 410, a transform block 415, a quantization block 420, an entropy encoding block 425, an inverse quantization block 430, an inverse transform block 435, a reconstruction block 440, and a loop filter block 445. Other structural variations of encoder 325 can be used to encode input image 5. As shown in FIG. 4A, dashed lines represent a reconstruction path amongst the several blocks and solid lines represent a forward path amongst the several blocks.

Each of the aforementioned blocks may be executed as software code stored in a memory (e.g., at least one memory 310) associated with an encoder system (e.g., encoder system 300 shown in FIG. 3A) and executed by at least one processor (e.g., at least one processor 305) associated with the encoder system. However, alternative implementations are contemplated such as an encoder implemented as a special purpose processor. For example, each of the aforementioned blocks (alone and/or in combination) may be an application-specific integrated circuit, or ASIC. For example, the ASIC may be configured as the prediction block 410, the transform block 415, the quantization block 420, and/or the like.

The prediction block 410 may be configured to utilize image and/or video frame coherence (e.g., pixels that have not changed as compared to previously encoded pixels). Prediction may include two types. For example, prediction may include intra-frame prediction and inter-frame prediction. Intra-frame prediction relates to predicting the pixel values in a block of an image relative to reference samples in neighboring, previously coded blocks of the same image. In intra-frame prediction, a sample is predicted from reconstructed pixels within the same frame for the purpose of reducing the residual amplitude and/or error that is coded by the transform (e.g., entropy encoding block 425) and entropy coding (e.g., entropy encoding block 425) part of a predictive transform codec. Inter-frame prediction relates to predicting the pixel values in a block of a frame relative to data of a previously coded frame (e.g., an I-frame).

The prediction block 410 can be configured to use a plurality of prediction modes (intra-prediction modes and/or inter-prediction modes) in a prediction of a target block. The prediction block 410 can be configured to determine the prediction mode that resulted in the best compression results (e.g., the fewest number of bits). In an example implementation, prediction using a gradient algorithm can have the best compression results. For example, a portion of an image with little complexity (e.g., minimal color variations, minimal texture variations, and/or the like), may have desirable compression results using the gradient prediction technique. A portion of an image with little complexity can include a sky, water, sand, grass, landscapes, and/or the like. The compressed bits 10 may include a header including an indication of the prediction mode used to compress each pixel and/or block of pixels.

The transform block 415 may be configured to convert the values of the pixels from the spatial domain to transform coefficients in a transform domain. The transform coefficients may correspond to a two-dimensional matrix of coefficients that is ordinarily the same size as the original block. In other words, there may be as many transform coefficients as pixels in the original block. However, due to the transform, a portion of the transform coefficients may have values equal to zero.

The transform block 415 may be configured to transform the residual (from the prediction block 410) into transform coefficients in, for example, the frequency domain. Typically, transforms include the Karhunen-Loève Transform (KLT), the Discrete Cosine Transform (DCT), the Singular Value Decomposition Transform (SVD) and the asymmetric discrete sine transform (ADST).

The quantization block 420 may be configured to reduce the data in each transformation coefficient. Quantization may involve mapping values within a relatively large range to values in a relatively small range, thus reducing the amount of data needed to represent the quantized transform coefficients. The quantization block 420 may convert the transform coefficients into discrete quantum values, which are referred to as quantized transform coefficients or quantization levels. For example, the quantization block 420 may be configured to add zeros to the data associated with a transformation coefficient. For example, an encoding standard may define 128 quantization levels in a scalar quantization process.

The quantized transform coefficients are then entropy encoded by entropy encoding block 425. The entropy-encoded coefficients, together with the information required to decode the block, such as the type of prediction used, motion vectors and quantizer value, are then output as the compressed video bits 10. The compressed video bits 10 can be formatted using various techniques, such as run-length encoding (RLE) and zero-run coding.

The reconstruction path in FIG. 4A is present to ensure that both the encoder 325 and the decoder 375 (described below with regard to FIG. 4B) use the same prediction mode, predictors and/or reference frames to decode compressed bits 10 (or compressed video frame bits). The reconstruction path performs functions that are similar to functions that take place during the decoding process that are discussed in more detail below, including inverse quantizing the quantized transform coefficients at the inverse quantization block 430 and inverse transforming the inverse quantized transform coefficients at the inverse transform block 435 in order to produce a derivative residual block (derivative residual). At the reconstruction block 440, the prediction block that was predicted at the prediction block 410 can be added to the derivative residual to create a reconstructed block. A loop filter block 445 can then be applied to the reconstructed block to reduce distortion such as blocking artifacts.

The encoder 325 described above with regard to FIG. 4A includes the blocks shown. However, example implementations are not limited thereto. Additional blocks may be added based on the different encoding configurations and/or techniques used. Further, each of the blocks shown in the encoder 325 described above with regard to FIG. 4A may be optional blocks based on the different encoding configurations and/or techniques used.

FIG. 4B is a schematic block diagram of a decoder 375 configured to decode compressed bits 10 (or compressed video frame bits). Decoder 375, similar to the reconstruction path of the encoder 325 discussed previously, includes an entropy decoding block 450, an inverse quantization block 455, an inverse transform block 460, a reconstruction block 465, a loop filter block 470, a prediction block 475, and a deblocking filter block 480.

The data elements within the compressed bits 10 can be decoded by entropy decoding block 450 (using, for example, Context Adaptive Binary Arithmetic Decoding) to produce a set of quantized transform coefficients. Inverse quantization block 455 dequantizes the quantized transform coefficients, and inverse transform block 460 inverse transforms (using ADST) the dequantized transform coefficients to produce a derivative residual that can be identical to that created by the reconstruction stage in the encoder 325.

Using header information (e.g., including at least one prediction mode used by an encoder) decoded from the compressed bits 10, decoder 375 can use prediction block 475 to create the same prediction block as was created in encoder 325. The prediction block can be added to the derivative residual to create a reconstructed block by the reconstruction block 465. The loop filter block 470 can be applied to the reconstructed block to reduce blocking artifacts. Deblocking filter block 480 can be applied to the reconstructed block to reduce blocking distortion, and the result is output as image 5.

The decoder 375 described above with regard to FIG. 4B includes the blocks shown. However, example implementations are not limited thereto. Additional blocks may be added based on the different encoding configurations and/or techniques used. Further, each of the blocks shown in the decoder 375 described above with regard to FIG. 4B may be optional blocks based on the different encoding configurations and/or techniques used.

Figure 5:
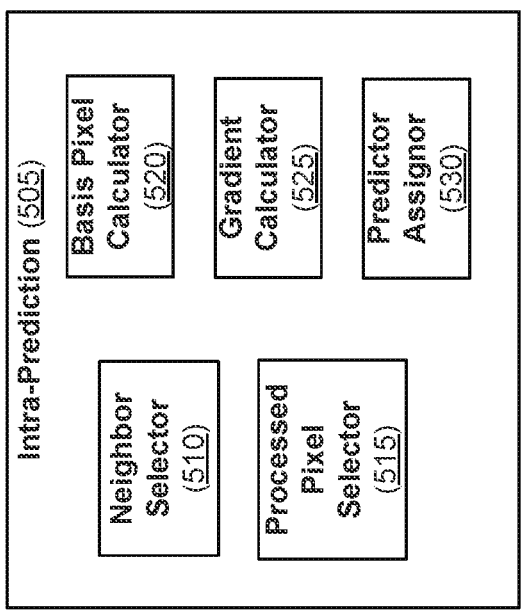
FIG. 5 illustrates a block diagram of an intra-predictor according to at least one example embodiment.

FIG. 5 illustrates a block diagram of an intra-predictor 505 according to at least one example embodiment. As shown in FIG. 5, the intra-predictor 505 (module or block) includes a neighbor selector 510 (module or block), a processed pixel selector 515 (module or block), a basis pixel calculator 520 (module or block), a gradient calculator 525 (module or block), and a predictor assignor 530 (module or block). In an example implementation, the intra-predictor 505 can be included in prediction block 410, 475 as shown in FIGS. 4A and 4B to implement an intra-prediction algorithm including a gradient predictor.

The neighbor selector 510 can be configured to select a neighbor(s) of a pixel or a block of pixels to be processed. The pixel or block of pixels to be processed (or target block) can be a pixel or a block of pixels to be compressed (encoded) or decompressed (decoded). A neighbor can be a neighboring column of pixels and/or a neighboring row of pixels. The column of pixels can be to the left or to the right of the pixel or block of pixels. The column of pixels can be directly adjacent to (on the left or the right) the pixel or block of pixels. The column of pixels can be indirectly adjacent to (separated by at least one pixel on the left or the right) the pixel or block of pixels. The row of pixels can be above or below the pixel or block of pixels. The row of pixels can be directly adjacent to (above or below) the pixel or block of pixels. The row of pixels can be indirectly adjacent to (separated by at least one pixel above or below) the pixel or block of pixels.

In the example implementation described above with regard to FIGS. 1A-1D and 2A-2E, the selected column is to the left of the target block. Further, the selected row is above the target block. This is sometimes referred to as selecting processed blocks that are the upper neighbors (or upper row) and left neighbors (or left column). In the example implementation described above with regard to FIGS. 2F and 2G, the selected column is to the left of the target block. Further, the selected row is below the target block. This is sometimes referred to as selecting processed blocks that are the bottom neighbor (or lower row) and left neighbors (or left column). In the example implementation described above with regard to FIG. 2H, the selected column is to the right of the target block. Further, the selected row is above the target block. This is sometimes referred to as selecting processed blocks that are the upper neighbors (or upper row) and right neighbors (or right column). In the example implementation described above with regard to FIGS. 2I-2K, the selected column is to the right of the target block. Further, the selected row is below the target block. This is sometimes referred to as selecting processed blocks that are the bottom neighbors (or lower row) and right neighbors (or right column). In the example implementation described above with regard to FIGS. 2I-2K, the selected column is to the right of the target block. Further, the selected row is below the target block. This is sometimes referred to as selecting processed blocks that are the bottom and right neighbors.

The processed pixel selector 515 can be configured to select at least one pixel from the neighboring column of pixels and/or to select at least one pixel from the neighboring row of pixels. For example, at least one pixel can be selected from (and including) each end of the neighboring column. At least one pixel can be selected from (and including) each end of the neighboring row In the example implementation described above with regard to FIGS. 1A-1D, three (3) pixels are selected from (and including) each end of the neighboring column and three (3) pixels are selected from (and including) each end of the neighboring row. However, example implementations are not limited to selecting three (3) pixels. The number of selected pixels can be based on the number of pixels in a row and/or a column. In other words, the selected pixels can be a portion of the pixels in the row and/or the column. However, the selected pixels can be all of the pixels in the row and/or the column. The number of selected pixels can be a design choice.

The basis pixel calculator 520 can be configured to calculate at least one basis value based on the selected at least one pixel from the neighboring column of pixels and/or the selected at least one pixel from the neighboring row of pixels. In other words, the basis pixel calculator 520 can generate two or more basis values based on at least one of a portion of pixels of the neighbor column and a portion of pixels of the neighbor row. In an example implementation, four (4) basis values are calculated. For example, three (3) of the four (4) basis values can be calculated based on the selected at least one pixel from the neighboring column of pixels and/or the selected at least one pixel from the neighboring row of pixels and the fourth basis value can be interpolated based on the three calculated basis values.

Basis pixels can be located at two or more corners of the target block. In an example implementation, basis pixels can be located adjacent to each corner of the target block. In other words, the basis pixels can be located at the corners of the target block, but not included in the target block. A first basis pixel (e.g., basis pixel 135 shown in FIG. 1C) can be located at the intersection (e.g., corner) of the neighboring row of pixels and the neighboring column of pixels. The basis value for this basis pixel can be calculated as the average of pixels selected from the neighboring row on the end of the row that intersects the neighboring column and pixels selected from the neighboring column that intersect the neighboring row.

A second basis pixel (e.g., basis pixel 140 shown in FIG. 1C) can be located within the neighboring row at the opposite end of the neighboring column. The basis value for the second basis pixel can be calculated as the average of the selected pixels that are located within the neighboring row at the opposite end of the neighboring column. A third basis pixel (e.g., basis pixel 145 shown in FIG. 1C) can be located within the neighboring column at the opposite end of the neighboring row. The basis value for the third basis pixel can be calculated as the average of the selected pixels that are located within the neighboring column at the opposite end of the neighboring row. The aforementioned average can be a weighted average. For example, the selected pixels that are close to a corner associated with a basis pixel can be weighted more heavily than the selected pixels further away from the corner when calculating the basis value for the basis pixel. Other weighting schemes are within the scope of this disclosure.

A fourth basis pixel (e.g., basis pixel 150 shown in FIG. 1C) can be located at the corner of the target block that is opposite the intersection of the neighboring column and the neighboring row. The basis value for the fourth basis pixel can be determined based on the first basis pixel, the second basis pixel and the third basis pixel. For example, an extrapolation of the basis values of the first basis pixel, the second basis pixel and the third basis pixel can be calculated, and the resultant value can be assigned to the fourth basis pixel. The extrapolation can be the basis value for the second basis pixel+the basis value for the third basis pixel−the basis value for the first basis pixel. Alternatively, an average of the basis values of the first basis pixel, the second basis pixel and the third basis pixel can be calculated, and the resultant value can be assigned to the basis value for the fourth basis pixel. This average can be a weighted average. For example, the basis value for the second basis pixel and the basis value for the third basis pixel can be weighted more heavily than the basis value for the first basis pixel when calculating the basis value for the fourth basis pixel. Other weighting schemes are within the scope of this disclosure.

The gradient calculator 525 can be configured to use a gradient algorithm to calculate predictor values to be assigned to pixels of the target block. In an example implementation, the gradient algorithm can be a bilinear interpolation. A bilinear interpolation can generate values for cells a two-dimensional (2D) matrix based on values some input values. A linear interpolation is done in a first direction (e.g., in a row or horizontal) and then a linear interpolation is done in a second direction (e.g., in a column or vertical). The resultant values for each cell in the matrix can be averaged (e.g., an average of the resultant value from the pass in the first direction with the pass in the second direction). The average can be a weighted average.

A gradient algorithm or color gradient algorithm can create an image including a progressive transition between two or more colors along a straight line. Further, the gradient algorithm or color gradient algorithm can include a number of pixels that are along the straight line. Therefore, a bilinear interpolation of a gradient algorithm or color gradient algorithm can include generating pixel values for each cell in a matrix using a progressive transition between two or more colors.

In an example implementation, the matrix can be based on the target block. For example, the matrix can be a C×R matrix based on the number of pixels in a column of the target block and a number of pixels in a row of the target block. The two or more colors can be the basis values of the four basis pixels located at the corners of the target block. Therefore, the gradient calculator 525 can be configured to generate color values for cells in a C×R matrix using a gradient algorithm having the basis values of the four basis pixels as color input. The C×R matrix being based on the target block.

The gradient calculator 525 can use other (linear and non-linear) gradient algorithms. For example, a tilted gradient algorithm can be used. A tilted gradient can be a number of degrees (e.g., 45 degrees) can be along a diagonal of the target block. Gradient algorithms can include radial gradients, conic gradients, skew gradients, and/or the like. An implementation can include a function call. For example, a linear gradient function call can be linear-gradient(first color, second color, num-cells). Other gradients and other gradient function calls are within the scope of this disclosure.

The predictor assignor 530 can be configured to assign prediction values for use during compression and/or during decompression of the target block. In an example implementation, the predictor assignor 530 can be configured to map cells of the C×R matrix to pixels in the target block. The predictor assignor 530 can be further configured to assign the color values of the C×R matrix as prediction values for the target block based on the mapping of the cells (e.g., mapping pixels or mapped pixels) of the C×R matrix to the pixels in the target block.

Figure 6:
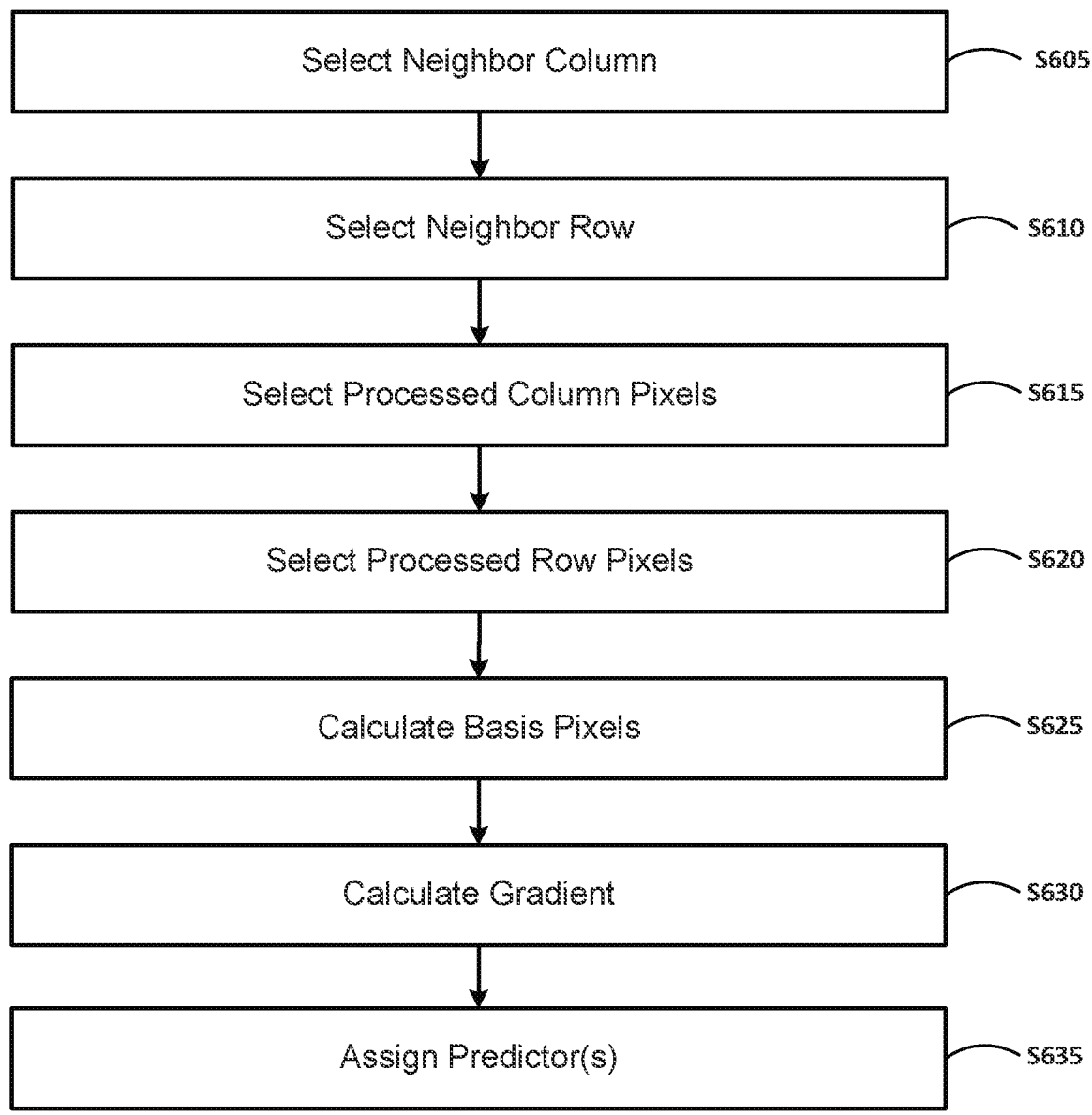
FIG. 6 illustrates a block diagram of a method for assigning a predictor value according to at least one example embodiment.

FIG. 6 illustrates a block diagram of a method for assigning a predictor value according to at least one example embodiment. The steps described with regard to FIG. 6 may be performed due to the execution of software code stored in a memory (e.g., at least one memory 310, 360) associated with an apparatus (e.g., as shown in FIGS. 3A and 3B) and executed by at least one processor (e.g., at least one processor 305, 355) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIG. 6.

According to example implementations, intra-prediction can include the use of a prediction algorithm including a gradient predictor. The use of the gradient predictor can reduce or eliminate block edge artifacts without the need of a post-reconstruction (e.g., a filter) process (to reduce or eliminate block edge artifacts). The prediction algorithm including a gradient predictor can be implemented in an encoder and/or a decoder. For example, the prediction algorithm including a gradient predictor can be implemented in an intra-prediction process in prediction block 410, 475 as shown in FIGS. 4A and 4B.

In step S605 a neighbor column is selected. For example, selecting the neighbor column can be based on a pixel or block of pixels to be processed (or target block). The pixel or block of pixels to be processed (or target block) can be a pixel or a block of pixels to be compressed (encoded) or decompressed (decoded). A neighbor can be a neighboring column of pixels. The column of pixels can be to the left or to the right of the pixel or block of pixels. The column of pixels can be directly adjacent to (on the left or the right) the pixel or block of pixels. The column of pixels can be indirectly adjacent to (separated by at least one pixel on the left or the right) the pixel or block of pixels.

In step S610 a neighbor row is selected. For example, selecting the neighbor row can be based on a pixel or block of pixels to be processed (or target block). The pixel or block of pixels to be processed (or target block) can be a pixel or a block of pixels to be compressed (encoded) or decompressed (decoded). A neighbor can be a neighboring row of pixels. The row of pixels can be above or below the pixel or block of pixels. The row of pixels can be directly adjacent to (above or below) the pixel or block of pixels. The row of pixels can be indirectly adjacent to (separated by at least one pixel above or below) the pixel or block of pixels.

In step S615 processed column pixels are selected. For example, at least one pixel from the neighboring column of pixels can be selected. For example, at least one pixel can be selected from (and including) each end of the neighboring column. In the example implementation described above with regard to FIGS. 1A-1D, three (3) pixels are selected from (and including) each end of the neighboring column. However, example implementations are not limited to selecting three (3) pixels.

In step S620 processed row pixels are selected. For example, at least one pixel from the neighboring row of pixels can be selected. For example, at least one pixel can be selected from (and including) each end of the neighboring row. In the example implementation described above with regard to FIGS. 1A-1D, three (3) pixels are selected from (and including) each end of the neighboring row. However, example implementations are not limited to selecting three (3) pixels.

In step S625 basis pixels are calculated. For example, the basis value can be based on the selected at least one pixel from the neighboring column of pixels and/or the selected at least one pixel from the neighboring row of pixels. In an example implementation, four (4) basis values are calculated. For example, three (3) of the four (4) basis values can be calculated based on the selected at least one pixel from the neighboring column of pixels and/or the selected at least one pixel from the neighboring row of pixels and the fourth basis value can be interpolated based on the three calculated basis values.

In an example implementation, basis pixels can be located adjacent to each corner of the target block. In other words, the basis pixels can be located at the corners of the target block, but not included in the target block. The basis values for the four (4) basis pixels can be determined based on the proximity of the selected neighboring row pixels and the selected neighboring column pixels. Determining basis values is described in more detail above.

In step S630 a gradient is calculated. For example, the gradient can be a bilinear interpolation (described in more detail above). A bilinear interpolation of a gradient algorithm or color gradient algorithm can include generating pixel values for each cell in a C×R matrix using a progressive transition between two or more colors. The two or more colors can be the basis values of the four basis pixels located at the corners of the target block. Therefore, the gradient calculation can generate color values for cells in the C×R matrix using the gradient algorithm having the basis values of the four basis pixels as color input. The C×R matrix being based on the target block.

In step S635 a predictor(s) is assigned. For example, the C×R matrix can be mapped to pixels in the target block. The color values of the C×R matrix can be assigned as prediction values for the target block based on the mapping of the cells of the C×R matrix to the pixels in the target block.

Figure 7:
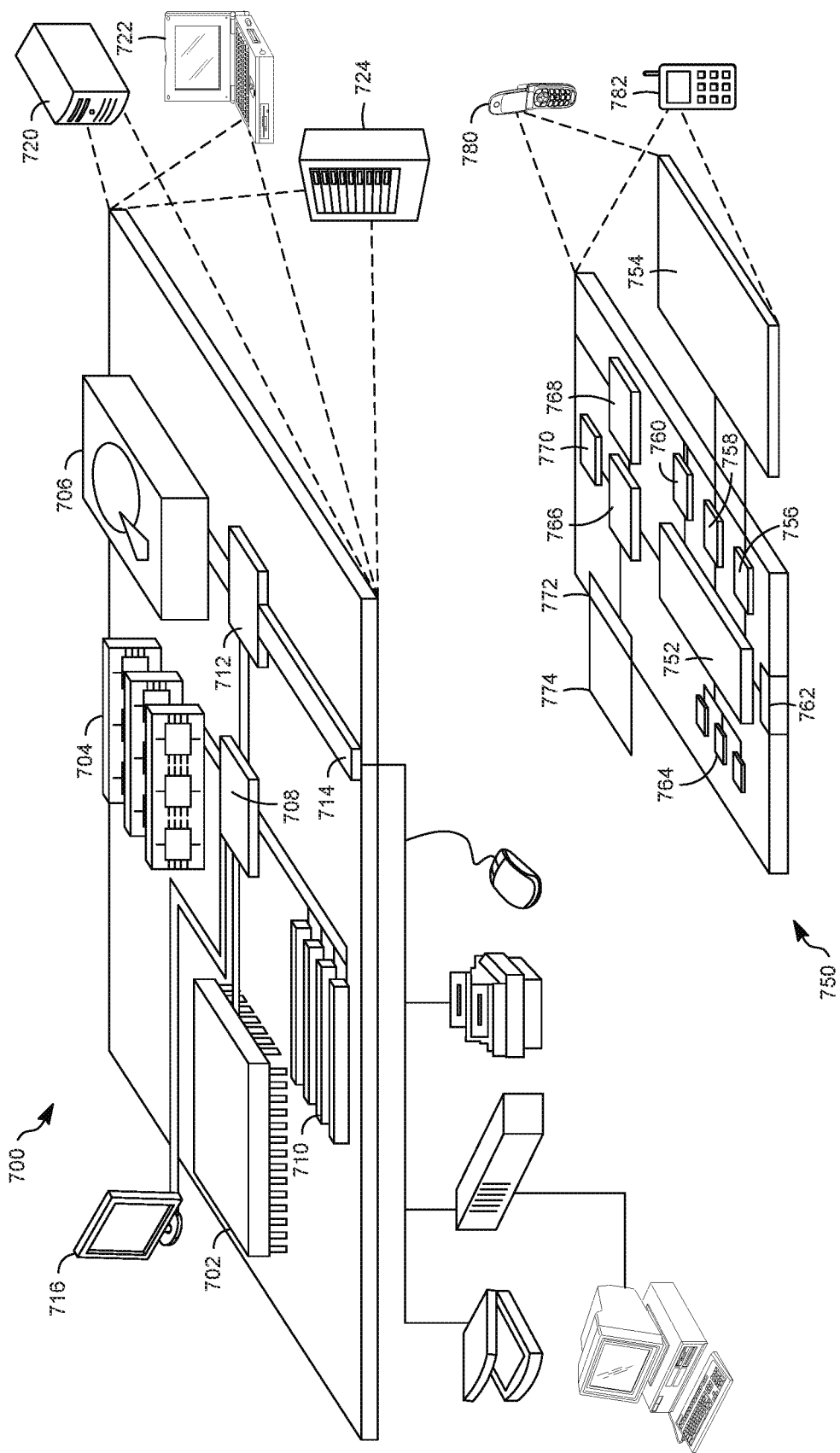
FIG. 7 shows an example of a computer device and a mobile computer device according to at least one example embodiment.

FIG. 7 shows an example of a computer device 700 and a mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

In a general aspect, a device, a system, a non-transitory computer-readable medium (having stored thereon computer executable program code which can be executed on a computer system), and/or a method can perform a process with a method including selecting, from an image, a target block of pixels to be compressed, selecting a neighbor column of the target block, selecting a neighbor row of the target block, generating two or more basis values based on at least one of a portion of pixels of the neighbor column and a portion of pixels of the neighbor row, calculating a gradient based on the two or more basis values, and assigning at least one predictor for the target block using the calculated gradient.

Implementations can include one or more of the following features. For example, the method can further comprise generating residuals based on the target block and the predictors. The selecting of the neighbor column can include selecting processed pixels, the selecting of the neighbor row can include selecting processed pixels, the neighbor column can be one of a left column or a right column, and the neighbor row can be one of an upper row or a lower row. The two or more basis values can be associated with basis pixels located at two or more corners of the target block. The two or more basis values can be associated with basis pixels located at two or more corners of the target block, and the generating of the two or more basis values can include calculating an average of two or more processed pixels.

For example, the two or more basis values can be four basis values associated with basis pixels located at each corner of the target block, three of the four basis values can be calculated based on an average of at least one of the portion of the pixels from the neighbor column and the portion of the pixels from the neighbor row, and a fourth basis value of the four basis values can be interpolated based on the three calculated basis values. The calculating of the gradient can include using a gradient algorithm to generate pixel values for each cell in a column x row matrix using a progressive transition between colors of the two or more basis values. The calculating of the gradient can include using a bilinear interpolation of a gradient algorithm. The assigning of the predictors for the target block can include mapping pixels associated with the gradient to pixels in the target block, and assigning color values associated with the gradient as prediction values for the target block based on the mapping of the pixels.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
   selecting, from an image, a target block of pixels to be compressed;
   selecting a neighbor column of the target block;
   selecting a neighbor row of the target block;
   generating a first basis value based on at least two pixels from a first end of the neighbor column;
   generating a second basis value based on at least two pixels from a first end of the neighbor row;
   generating a third basis value based on at least two pixels from a second end of the neighbor column and at least two pixels from a second end of the neighbor row;
   calculating a gradient based on the first basis value, the second basis value, and the third basis value; and
   assigning at least one predictor for the target block using the calculated gradient.

2. The method of claim 1 further comprising generating residuals based on the target block and the at least one predictor.

3. The method of claim 1, wherein
   the selecting of the neighbor column includes selecting processed pixels,
   the selecting of the neighbor row includes selecting processed pixels,
   the neighbor column is one of a left column or a right column, and
   the neighbor row is one of an upper row or a lower row.

4. The method of claim 1, wherein at least two of the first basis value, the second basis value, and the third basis value are associated with basis pixels located at at least two corners of the target block.

5. The method of claim 1, wherein
   the generating of the third basis value includes calculating an average of the at least two pixels from a second end of the neighbor column and the at least two pixels from a second end of the neighbor row,
   the generating of the first basis value includes calculating an average of the at least two pixels from a first end of the neighbor column, and
   the generating of the second basis value includes calculating an average of the at least two pixels from a first end of the neighbor row.

6. The method of claim 1, wherein
   a fourth basis value is interpolated based on at least two of the first basis value, the second basis value, and the third basis value.

7. The method of claim 1, wherein the calculating of the gradient includes using a gradient algorithm to generate pixel values for each cell in a column x row matrix using a progressive transition between colors of at least two of the first basis value, the second basis value, and the third basis value.

8. The method of claim 1, wherein the calculating of the gradient includes using a bilinear interpolation of a gradient algorithm.

9. The method of claim 1, wherein the assigning of the at least one predictor for the target block includes
   mapping pixels associated with the gradient to pixels in the target block, and
   assigning color values associated with the gradient as prediction values for the target block based on the mapping of the pixels.

10. A non-transitory computer readable medium containing instructions that when executed cause a processor of a computer system to perform any of the steps of the method of claim 1.

11. A computer system for compressing images configured to perform any of the steps of the method of claim 1.

12. A system comprising:
    a memory storing a set of instructions; and
    a processor configured to execute the set of instructions to cause the system to:
    receive an image to be compressed;
    select a target block of pixels from the image;

select a neighbor column of the target block;
select a neighbor row of the target block;
generate a first basis value based on at least two pixels from a first end of the neighbor column;
generate a second basis value based on at least two pixels from a first end of the neighbor row;
generate a third basis value based on at least two pixels from a second end of the neighbor column and at least two pixels from a second end of the neighbor row;
calculate a gradient based on the first basis value, the second basis value, and the third basis value; and
assign at least one predictor for the target block using the calculated gradient.

13. The system of claim 12, wherein the set of instructions further comprise generating residuals based on the target block and the at least one predictor.

14. The system of claim 12, wherein
the selecting of the neighbor column include selecting processed pixels,
the selecting of the neighbor row includes selecting processed pixels,
the neighbor column is one of a left column or a right column, and
the neighbor row is one of an upper row or a lower row.

15. The system of claim 12, wherein at least two of the first basis value, the second basis value, and the third basis value are associated with basis pixels located at at least two corners of the target block.

16. The system of claim 12, wherein
the generating of the third basis value includes calculating an average of the at least two pixels from a second end of the neighbor column and the at least two pixels from a second end of the neighbor row,
the generating of the first basis value includes calculating an average of the at least two pixels from a first end of the neighbor column, and
the generating of the second basis value includes calculating an average of the at least two pixels from a first end of the neighbor row.

17. The system of claim 12, wherein
a fourth basis value is interpolated based on at least two of the first basis value, the second basis value, and the third basis value.

18. The system of claim 12, wherein the calculating of the gradient includes using a gradient algorithm to generate pixel values for each cell in a column x row matrix using a progressive transition between colors of at least two of the first basis value, the second basis value, and the third basis value.

19. The system of claim 12, wherein the calculating of the gradient includes using a bilinear interpolation of a gradient algorithm.

20. The system of claim 12, wherein the assigning of the at least one predictor for the target block includes
mapping pixels associated with the gradient to pixels in the target block, and
assigning color values associated with the gradient as prediction values for the target block based on the mapping of the pixels.

* * * * *